(12) United States Patent
Li et al.

(10) Patent No.: US 12,040,996 B2
(45) Date of Patent: Jul. 16, 2024

(54) CHIP MODULE, COMMUNICATION SYSTEM, AND PORT ALLOCATION METHOD

(71) Applicant: HUAWEI TECHNOLOGIES CO., LTD., Guangdong (CN)

(72) Inventors: Yongyao Li, Shenzhen (CN); Jiang Zhu, Shenzhen (CN); Lv Chen, Shenzhen (CN); Yimin Yao, Shenzhen (CN); Wei Li, Shenzhen (CN); Can Chen, Chengdu (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 18/147,852

(22) Filed: Dec. 29, 2022

(65) Prior Publication Data

US 2023/0136006 A1 May 4, 2023

Related U.S. Application Data

(63) Continuation of application No. PCT/CN2021/103791, filed on Jun. 30, 2021.

(30) Foreign Application Priority Data

Jun. 30, 2020 (CN) .......................... 202010622485.3
Aug. 9, 2020 (CN) .......................... 202010792434.5

(51) Int. Cl.
*H04L 49/00* (2022.01)

(52) U.S. Cl.
CPC ................................ *H04L 49/3036* (2013.01)

(58) Field of Classification Search
None
See application file for complete search history.

(56) References Cited

U.S. PATENT DOCUMENTS

| 7,158,536 | B2 | 1/2007 | Ching et al. |
| 2005/0002421 | A1* | 1/2005 | Ito .......................... H04L 1/1809 370/428 |

(Continued)

FOREIGN PATENT DOCUMENTS

| CN | 102017002 A | 4/2011 |
| CN | 102625440 A | 8/2012 |

(Continued)

*Primary Examiner* — Alex Skripnikov
(74) *Attorney, Agent, or Firm* — WOMBLE BOND DICKINSON (US) LLP

(57) ABSTRACT

A chip module has a plurality of first ports, at least some or all of the first ports are first selection ports, and each first selection port may act as a write port or a read port. The chip module further includes a first control module. The first control module controls, based on a transmit/receive requirement of the chip module, the first selection port to be switched to a read port or a write port, to match the transmit/receive requirement of the chip module. The first selection port may selectively act as a read port or a write port, so that switching can be performed based on an operating state of the chip module, increasing a read/write bandwidth. The first control module controls an operating state of the first selection port, to flexibly adjust a quantity of read ports and a quantity of write ports of the chip module.

20 Claims, 10 Drawing Sheets

(56) References Cited

U.S. PATENT DOCUMENTS

| | | | |
|---|---|---|---|
| 2007/0130374 A1 | 6/2007 | Bains et al. | |
| 2010/0332822 A1* | 12/2010 | Liu | H04L 63/08 713/151 |
| 2011/0289258 A1 | 11/2011 | Ware | |
| 2017/0111193 A1 | 4/2017 | Chen et al. | |

FOREIGN PATENT DOCUMENTS

| | | |
|---|---|---|
| CN | 103039006 A | 4/2013 |
| CN | 104969208 A | 10/2015 |
| CN | 106776428 A | 5/2017 |
| CN | 108010488 A | 5/2018 |
| CN | 108363581 A | 8/2018 |
| JP | 2005024915 A | 1/2005 |

* cited by examiner

CHIP MODULE, COMMUNICATION SYSTEM, AND PORT ALLOCATION METHOD

CROSS-REFERENCE TO RELATED APPLICATIONS

This application is a continuation of International Application No. PCT/CN2021/103791, filed on Jun. 30, 2021, which claims priority to a Chinese patent application No. 202010792434.5, filed on Aug. 9, 2020 and Chinese Patent Application No. 202010622485.3, filed on Jun. 30, 2020. All of the aforementioned patent applications are hereby incorporated by reference in their entireties.

TECHNICAL FIELD

This application relates to the field of communication technologies, and in particular, to a chip module, a communication system, and a port allocation method.

BACKGROUND

In a common computer system and communication system, fast reading and writing are performed between a CPU (central processing unit) and a memory by using a parallel bus. In such a manner, nearly half of I/O (input and output) ports of the CPU and a considerably large wiring area of a printed circuit board need to be occupied. In addition, parallel transmission leads to large crosstalk between signals, and the crosstalk limits an increase in a bus signal rate, and further seriously hinders an increase in a read/write bandwidth between the printed circuit board and the memory.

Therefore, serial high-speed signal transmission for memory reading/writing has been proposed as a new CPU-memory bus manner. A SerDes (short for a SERializer serializer/DESerializer deserializer) differential signal can better resist impact from crosstalk and greatly increase a signal transmission rate. However, a fixed unidirectional transmission manner of a conventional SerDes and I/O resource allocation with equal sending and receiving bandwidths do not match a manner with random allocation of a memory reading/writing direction.

SUMMARY

This application provides a chip module, a communication system, and a port allocation method, to improve flexibility of a port when the communication system performs communication.

According to a first aspect, a chip module is provided. The chip module may be applied to a communication system, and is configured to transmit read/write data. The chip module has a plurality of first ports. Among the plurality of first ports, each first selection port may act as a write port or a read port. The chip module further includes a first control module. The first control module controls, based on a transmit/receive requirement of the chip module, the first selection port to be switched to a read port or a write port, to match the transmit/receive requirement of the chip module. In the foregoing technical solution, the first selection port may selectively act as a read port or a write port, so that switching can be performed based on an operating state of the chip module, thereby increasing a read/write bandwidth of the chip module. In addition, the first control module controls an operating state of the first selection port, to flexibly adjust a quantity of read ports and a quantity of write ports of the chip module.

In an embodiment, each of the plurality of first ports is a first selection port. All the ports may be switched to write ports or read ports.

In an embodiment, among the plurality of first ports, some are fixed read ports, some are fixed write ports, and the others are first selection ports. Only a few first selection ports need to be switched to ports with an adjustable ratio of read ports to write ports, thereby facilitating switching.

In an embodiment, the first control module is further configured to: obtain a required ratio of write ports to read ports as a target ratio based on the transmit/receive requirement of the chip module; determine a current ratio of write ports to read ports in the current chip module; and when the current ratio is different from the target ratio, control, based on a result of comparison between the target ratio and the current ratio, the first selection port to be switched to a read port or a write port, until the ratio of read ports to write ports of the chip module is consistent with the target ratio. This implements effect that the transmit/receive requirement of the chip module corresponds to the port, and a degree of freedom of matching is increased.

In an embodiment, the first control module is further configured to: obtain a required quantity and locations of write ports and a required quantity and locations of read ports based on the transmit/receive requirement of the chip module; and compare the required quantity and the locations of write ports and the required quantity and the locations of read ports with a current quantity and locations of write ports and a current quantity and locations of read ports, to determine a first selection port that needs to be switched.

In an embodiment, the first control module is further configured to: determine the first selection port that needs to be switched, switch the determined first selection port based on the transmit/receive requirement of the chip module, and adjust a transmit/receive state of the corresponding first selection port based on the transmit/receive requirement of the chip module.

In an embodiment, the first control module is further configured to: when the current ratio is less than the target ratio, control at least some of the first selection ports acting as read ports to be switched to write ports; or when the current ratio is greater than the target ratio, control at least some of the first selection ports acting as write ports to be switched to read ports. This implements adjustment of the quantity of write ports and the quantity of read ports.

In an embodiment, each first selection port includes: a first connection port, a first receiving circuit, a first sending circuit, and a first selector switch. The first connection port is connected to one of the first receiving circuit or the first sending circuit by using the first selector switch, and the other circuit is disconnected from the first connection port. When the first receiving circuit is connected to the first connection port, the first selection port acts as a write port. When the first sending circuit is connected to the first connection port, the first selection port acts as a read port. When the first selection port acts as a read port, the receiving circuit is totally disconnected from the first connection port. Similarly, when the first selection port acts as a write port, the sending circuit is totally disconnected from the first connection port. In this way, impact of an idle circuit on the first selection port is avoided, and working effect of the chip module is improved.

In an embodiment, the first control module is further configured to: send a switching indication message to a peer chip module paired with the chip module, and receive a switching completion indication message fed back by the peer chip module. This implements information interaction between the two chip modules.

In an embodiment, the first selector switch is a transfer switch with a nanosecond-level response. The response level is high.

In an embodiment, the first selector switch is a single-pole double-throw switch. This implements switching of the first selection port to a write port or a read port.

In an embodiment, the first selector switch is a metal-oxide semiconductor field-effect transistor.

According to a second aspect, a chip module is provided. The chip module includes a plurality of second ports and a second control module, and at least some of the plurality of second ports are second selection ports. The second control module controls, based on a transmit/receive requirement of a peer chip module paired with the chip module, the second selection port to be switched to a read port or a write port. In the foregoing technical solution, the second selection port may selectively act as a read port or a write port, so that switching can be performed based on an operating state of the chip module, thereby increasing a read/write bandwidth of the chip module.

In an embodiment, each of the plurality of second ports is a second selection port. All the ports may be switched to write ports or read ports.

In an embodiment, among the plurality of second ports, some are fixed read ports, some are fixed write ports, and the others are second selection ports. Only a few second selection ports need to be switched to ports with an adjustable ratio of read ports to write ports, thereby facilitating switching.

In an embodiment, the second control module is configured to: after receiving a switching indication message sent by the peer chip module, control the corresponding second selection port to be switched to a read port or a write port; and after switching is completed, the second control module is further configured to send a switching completion indication message to the first control module. This implements information exchange between the two chip modules.

In an embodiment, each second selection port includes: a second connection port, a second receiving circuit, a second sending circuit, and a second selector switch. The second connection port is connected to one of the second receiving circuit and the second sending circuit by using the second selector switch, and the other circuit is disconnected from the second connection port. When the second receiving circuit is connected to the second connection port, the second selection port acts as a write port. When the second sending circuit is connected to the second connection port, the second selection port acts as a read port. In addition, when the second selection port acts as a read port, the receiving circuit is totally disconnected from the second connection port. Similarly, when the second selection port acts as a write port, the sending circuit is totally disconnected from the second connection port. In this way, impact of an idle circuit on the second selection port is avoided, and working effect of the chip module is improved.

In an embodiment, the second selector switch is a transfer switch with a nanosecond-level response. The response level is high.

In an embodiment, the second selector switch is a single-pole double-throw switch. This implements switching of the second selection port to a write port or a read port.

In an embodiment, the second selector switch is a metal-oxide semiconductor field-effect transistor.

According to a third aspect, a communication system is provided. The communication system includes a first chip module and a second chip module. The first chip module is the chip module in any one of the foregoing embodiments. First ports of the first chip module and second ports of the second chip module are connected in a one-to-one correspondence. In the foregoing technical solution, a disposed first selection port may selectively act as a read port or a write port, so that switching can be performed based on an operating state of the first chip module, thereby increasing a read/write bandwidth of the communication system. In addition, when the first selection port acts as a read port, a receiving circuit is totally disconnected from a connection port. Similarly, when the first selection port acts as a write port, a sending circuit is totally disconnected from the connection port. In this way, impact of an idle circuit on the first selection port is avoided, and working effect of the communication system is improved.

In an embodiment, the second chip module is the chip module in any one of the foregoing embodiments, thereby increasing the read/write bandwidth of the communication system.

According to a fourth aspect, a communication system is provided, and includes a first chip module and a second chip module. The second chip module is the chip module in any one of the foregoing embodiments. First ports of the first chip module and second ports of the second chip module are connected in a one-to-one correspondence. In the foregoing technical solution, a disposed first selection port may selectively act as a read port or a write port, so that switching can be performed based on an operating state of the second chip module, thereby increasing a read/write bandwidth of the communication system. In addition, when the first selection port acts as a read port, a receiving circuit is totally disconnected from a connection port. Similarly, when the first selection port acts as a write port, a sending circuit is totally disconnected from the connection port. In this way, impact of an idle circuit on the first selection port is avoided, and working effect of the communication system is improved.

According to a fifth aspect, a port allocation method is provided. The allocation method includes the following operations: obtaining a transmit/receive requirement of a chip module; and switching a first selection port of the chip module to a read port or a write port based on the obtained transmit/receive requirement of the chip module. In the foregoing technical solution, the first selection port may selectively act as a read port or a write port, so that switching can be performed based on an operating state of the chip module, thereby increasing a read/write bandwidth of the chip module. In addition, a first control module controls an operating state of the first selection port, to flexibly adjust a quantity of read ports and a quantity of write ports of the chip module.

In an embodiment, the switching a first selection port to a read port or a write port based on the obtained transmit/receive requirement of the chip module includes:

obtaining a required ratio of write ports to read ports as a target ratio based on the transmit/receive requirement of the chip module;

determining a current ratio of write ports to read ports in the current chip module; and when the current ratio is different from the target ratio, controlling, based on a result of comparison between the target ratio and the current ratio, the first selection port to be switched to a read port or a write port, until the ratio of read ports to write ports of the chip module is consistent with the target ratio. This implements effect that the transmit/receive requirement of the chip module corresponds to the port, and a degree of freedom of matching is increased.

In an embodiment, the method further includes: determining a first selection port that needs to be switched, switching the determined first selection port based on the transmit/receive requirement of the chip module, and adjusting a transmit/receive state of the corresponding first selection port based on the transmit/receive requirement of the chip module.

In an embodiment, the method further includes: sending a switching indication message to a peer chip module paired with the chip module, and receiving a switching completion indication message fed back by the peer chip module. This implements information interaction between the two chip modules.

According to a sixth aspect, a port allocation method is provided. The method includes the following operations: obtaining a transmit/receive requirement of a peer chip module; and switching a second selection port of a chip module to a read port or a write port based on the transmit/receive requirement of the peer chip module. In the foregoing technical solution, the second selection port may selectively operate as a read port or a write port, so that switching can be performed based on an operating state of the chip module, thereby increasing a read/write bandwidth of the chip module.

In an embodiment, the switching a second selection port of a chip module to a read port or a write port based on the transmit/receive requirement of the peer chip module is specifically: after receiving a switching indication message sent by the peer chip module, controlling the corresponding second selection port to be switched to a read port or a write port; and after switching is completed, sending a switching completion indication message to the peer chip module. This implements switching of the second selection port, and implements information interaction between the two chip modules.

According to a seventh aspect, a port allocation method is provided. The method includes the following operations:
  obtaining a transmit/receive requirement of a first chip module;
  switching a first selection port of the first chip module to a read port or a write port based on the transmit/receive requirement of the first chip module; and
  switching a second selection port of a paired second chip module to a read port or a write port based on the transmit/receive requirement of the first chip module.

In the foregoing technical solution, the selection port may selectively act as a read port or a write port, so that switching can be performed based on an operating state of the first chip module, thereby increasing a read/write bandwidth of a communication system. In addition, based on an operating state of the selection port, a quantity of read ports and a quantity of write ports of the chip module are flexibly adjusted, thereby improving flexibility of the entire communication system.

In an embodiment, the switching a first selection port to a read port or a write port based on the transmit/receive requirement of the first chip module is specifically:
  obtaining a required ratio of write ports to read ports as a target ratio based on the transmit/receive requirement of the first chip module;
  determining a current ratio of write ports to read ports in the current first chip module; and
  when the current ratio is different from the target ratio, controlling, based on a result of comparison between the target ratio and the current ratio, the first selection port to be switched to a read port or a write port, until the ratio of read ports to write ports of the first chip module is consistent with the target ratio. This implements effect that the transmit/receive requirement of the chip module corresponds to the port, and a degree of freedom of matching is increased.

In an embodiment, the method further includes:
  sending, by the first chip module, a switching indication message to the second chip module; and
  after receiving the switching indication message sent by the first chip module, controlling, by the second chip module, the corresponding second selection port to be switched to a read port or a write port; and after switching is completed, sending a switching completion indication message to the first chip module; and
  receiving, by the first chip module, the switching completion indication message sent by the second chip module. This implements information interaction between the two chip modules.

According to an eighth aspect, an embodiment of this application provides a signal processing module. The signal processing module includes a processor, configured to perform the method described in the fifth aspect, the sixth aspect, or the seventh aspect. The signal processing module may further include a memory, configured to store instructions and data. The memory is coupled to the processor. When executing program instructions stored in the memory, the processor can perform the method described in the fourth aspect. The signal processing module may further include a communication interface, and the communication interface is configured to perform communication between the signal processing module and another device. For example, the communication interface may be a transceiver, a circuit, a bus, a module, or a communication interface of another type, and the another device may be a network device, a terminal device, or the like.

In an embodiment, the signal processing module includes: a memory, configured to store program instructions; a processor, configured to invoke the instructions stored in the memory, so that the signal processing module performs the method in any one of the fifth aspect or the possible embodiments of the fifth aspect of this application, the method in any one of the sixth aspect or the possible embodiments of the sixth aspect of this application, or the method in any one of the seventh aspect or the possible embodiments of the seventh aspect of this application.

According to a ninth aspect, an embodiment of this application further provides a computer-readable storage medium, including instructions. When the instructions are run on a computer, the computer is enabled to perform the method in any one of the fifth aspect or the possible embodiments of the fifth aspect of this application, the method in any one of the sixth aspect or the possible embodiments of the sixth aspect of this application, or the method in any one of the seventh aspect or the possible embodiments of the seventh aspect of this application.

According to a tenth aspect, an embodiment of this application further provides a computer program product, including instructions. When the instructions are run on a computer, the computer is enabled to perform the method in any one of the fifth aspect or the possible embodiments of the fifth aspect of this application, the method in any one of the sixth aspect or the possible embodiments of the sixth aspect of this application, or the method in any one of the seventh aspect or the possible embodiments of the seventh aspect of this application.

In addition, for technical effect brought about by any one of the possible embodiments of the eighth aspect to the tenth aspect, refer to the effect brought about by different embodiments of the method part. Details are not described herein again.

According to an eleventh aspect, a chip module is provided. The chip module includes a plurality of first ports and a first control module. At least some of the plurality of first ports are first selection ports, and the first selection ports each can act as a read port or a write port. The first control module controls, based on a transmit/receive requirement of the chip module or a received switching instruction, the first selection port to be switched to a read port or a write port, to match the transmit/receive requirement of the chip module. In the foregoing technical solution, the first selection port may selectively act as a read port or a write port, so that switching can be performed based on an operating state of the chip module, thereby increasing a read/write bandwidth of the chip module. In addition, the first control module controls an operating state of the first selection port, to flexibly adjust a quantity of read ports and a quantity of write ports of the chip module.

In an embodiment, the received switching instruction comes from a peer chip module. The peer chip module controls the chip module to perform port switching.

In an embodiment, the first control module is configured to: after receiving a switching indication message sent by the peer chip module, control the corresponding first selection port to be switched to a read port or a write port; and after switching is completed, the first control module is further configured to send a switching completion indication message to the first control module. This implements information interaction.

In an embodiment, the first control module is further configured to: obtain a required ratio of write ports to read ports as a target ratio based on the transmit/receive requirement of the chip module; determine a current ratio of write ports to read ports in the current chip module; and when the current ratio is different from the target ratio, control, based on a result of comparison between the target ratio and the current ratio, the first selection port to be switched to a read port or a write port, until the ratio of read ports to write ports of the chip module is consistent with the target ratio.

In an embodiment, each first selection port includes: a first connection port, a first receiving circuit, a first sending circuit, and a first selector switch. The first connection port is connected to one of the first receiving circuit and the first sending circuit by using the first selector switch. When the first receiving circuit is connected to the first connection port, the first selection port acts as a write port. When the first sending circuit is connected to the first connection port, the first selection port acts as a read port.

According to a twelfth aspect, a mobile terminal is provided. The mobile terminal includes the chip module in any one of the foregoing embodiments and a peer chip module connected by using a signal. In the foregoing technical solution, a disposed first selection port may selectively act as a read port or a write port, so that switching can be performed based on an operating state of the chip module, thereby increasing a read/write bandwidth of a communication system. In addition, when the first selection port acts as a read port, a receiving circuit is totally disconnected from a connection port. Similarly, when the first selection port acts as a write port, a sending circuit is totally disconnected from the connection port. In this way, impact of an idle circuit on the first selection port is avoided, and working effect of the communication system is improved.

DESCRIPTION OF EMBODIMENTS

The following further describes in detail embodiments of this application with reference to the accompanying drawings.

Figure 1:
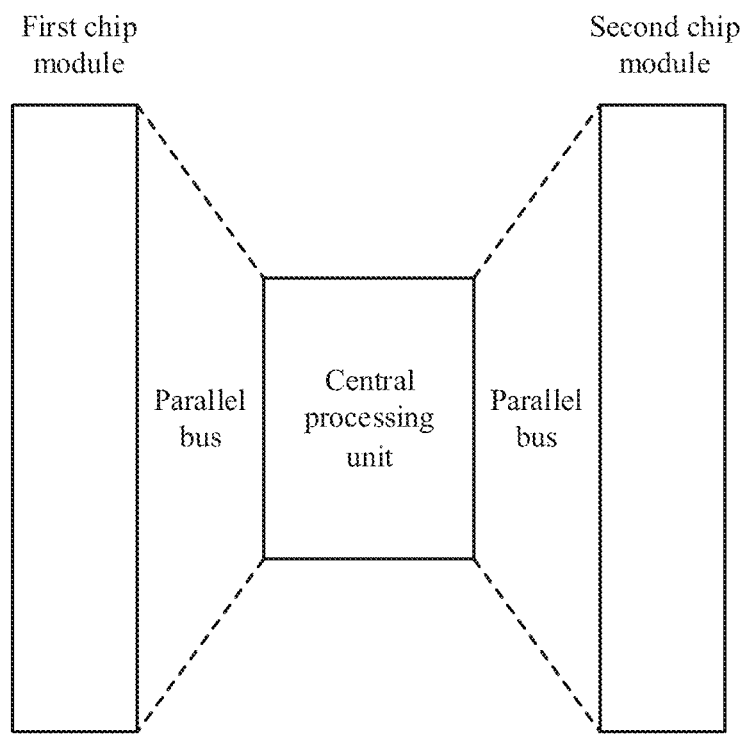
FIG. 1 is a block diagram of communication between a first chip module and a second chip module according to an embodiment of this application.

A chip module provided in an embodiment of this application is applied to a common computer system or communication system. FIG. 1 is a block diagram of communication between two chip modules. For ease of description, the two chip modules are respectively named a first chip module and a second chip module. The second chip module is a peer chip of the first chip module, and the first chip module is a peer chip of the second chip module. The first chip module and the second chip module may be different devices. For example, the first chip module is a central processing unit (CPU), and the second chip module is a memory. The CPU is connected to the memory by using a parallel bus, and fast reading and writing are performed by using the parallel bus. In such a manner, nearly half of I/O (input and output) ports of the CPU and a considerably large wiring area need to be occupied. In addition, parallel transmission leads to large crosstalk between signals, and the crosstalk limits an increase in a bus signal rate, and further seriously hinders an increase in a read/write bandwidth between the CPU and the memory. Therefore, serial high-speed signal transmission for memory reading/writing has also been proposed as a new CPU-memory bus manner.

Figure 2:
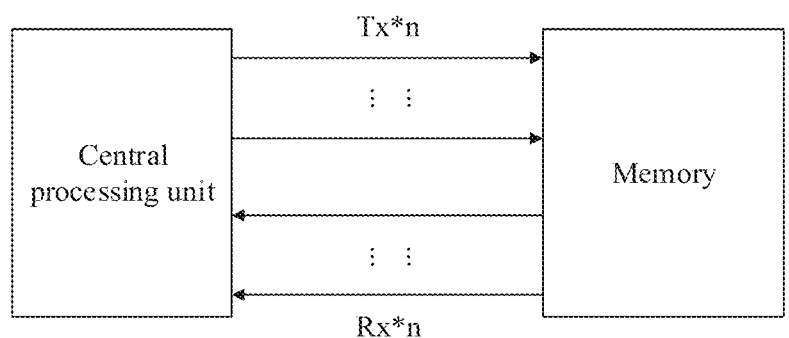
FIG. 2 is a schematic diagram of CPU-memory communication in a conventional technology.

FIG. 2 shows a CPU-memory bus manner. Communication is performed between the CPU and the memory by using a SerDes (short for a SERializer/DESerializer) differential signal, and the SerDes differential signal can better resist impact from crosstalk and greatly increase a signal transmission rate. However, a fixed unidirectional transmission manner of a conventional SerDes differential signal and I/O port resource allocation with equal sending and receiving bandwidths do not match behavior with a random memory reading/writing direction. When n Tx (T, transmit; x represents a cross symbol) ports and n Rx (R, receive; x represents a cross symbol) ports are used, but a Tx ports and b Rx ports are required between the CPU and the memory, the existing n Tx ports cannot match the n Rx ports, where a, b, and n are positive integers, and are unequal to one another.

Therefore, how to properly allocate I/O ports to adapt to memory read/write behavior has become a main research direction for increasing a CPU-memory read/write bandwidth or another similar bus bandwidth. In view of this, an embodiment of this application provides a new communication system and a new port allocation method.

The communication system provided in an embodiment of this application may determine transmit and receive operation requirements for a future time period by using a first chip module (for example, a CPU); compare the transmit and receive operation requirements with a current transmit/receive state; mark, based on a comparison result, a location of an I/O port whose state needs to be changed; and initiate state switching of a specified I/O port of the first chip module and state switching of a specified I/O port of a peer second chip module (for example, a memory) within a time period by using a preset control mechanism, to match an actual service data transmit/receive requirement for a next time period, thereby increasing an effective service bandwidth. The first chip module and the second chip module in the system are separately described below with reference to the accompanying drawings.

Figure 3:
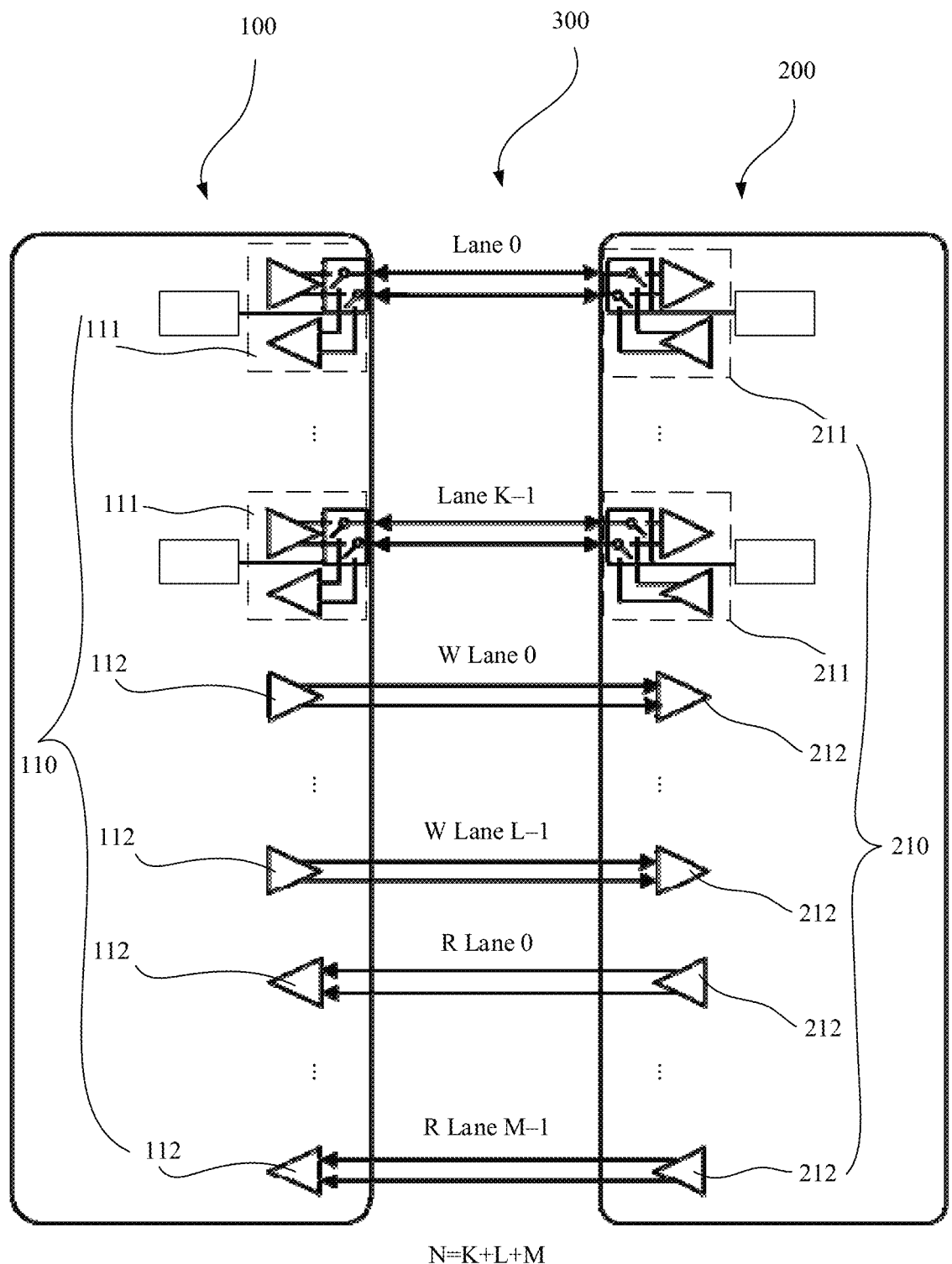
FIG. 3 is a block diagram of a structure of a communication system according to an embodiment of this application.

FIG. 3 is a schematic diagram of a structure of a system. A first chip module 100 and a second chip module 200 each have a plurality of I/O ports. For ease of differentiation, the I/O ports of the first chip module 100 are named first ports 110, and the I/O ports of the second chip module 200 are named second ports 210.

In an embodiment, the plurality of first ports 110 may be classified into fixed ports 112 and selection ports based on functions. To differ from the ports of the second chip module 200, the selection ports of the first chip module 100 are named first selection ports 111. The fixed ports 112 are ports that can implement only a read or write function. For example, the fixed ports 112 may be classified into a read port (a port that can implement the read function) and a write port (a port that can implement the write function). The first selection ports 111 are ports that can be switched between the read function and the write function. The first selection ports 111 each have two operating states. In one operating state, the first selection port 111 acts as a write port. In the other operating state, the first selection port 111 acts as a read port.

In an embodiment, the plurality of second ports 210 may also be classified into fixed ports 212 and selection ports based on functions. To differ from the first selection ports 111, the selection ports of the second chip module 200 are named second selection ports 211. The fixed ports 212 may be classified into a read port (a port that can implement the read function) and a write port (a port that can implement the write function). The second selection ports 211 are ports that can be switched between the read function and the write function. The second selection ports 211 each have two operating states. In one operating state, the second selection port 211 acts as a write port. In the other operating state, the second selection port 211 acts as a read port. During specific settings, among the plurality of first ports 110, some may be selected as fixed read ports, some may be selected as fixed write ports, and the others are the first selection ports 111.

In an embodiment, the fixed ports 112 and the fixed ports 212 correspond to each other and are connected by using a parallel bus 300, and the first selection ports 111 and the second selection ports 211 also correspond to each other and are connected by using the parallel bus 300.

The read ports and the write ports of the first chip module 100 are paired with the write ports and the read ports of the second chip module 200. For example, one of two ports connected to a same service lane of the parallel bus 300 is a read port, and the other port is a write port. For example, when a first port 110 connected to a service lane is a read port, a second port 210 connected to the service lane is a write port; and when a first port 110 connected to a service lane is a write port, a second port 210 connected to the service lane is a read port. During specific settings, among the plurality of second ports 210, some may be selected as fixed read ports, some may be selected as fixed write ports, and the others are the second selection ports.

The system shown in FIG. 3 is used as an example. A quantity of the first ports 110 of the first chip module 100 is N. The N first ports 110 include K first selection ports 111, L read ports, and M write ports, where N, K, L, and M are all positive integers greater than 1, and N=K+L+M. A quantity of the second ports 210 of the second chip module 200 is N. The N second ports 210 include K second selection ports 211, L write ports, and M read ports. Both the quantity of the first ports 110 of the first chip module 100 and a function of each first port 110 match the quantity of the second ports 210 of the second chip module 200 and a function of each second port 210, thereby implementing data transmission.

An arrow direction of a service lane in FIG. 3 represents a data transmission direction. The M write ports and the M read ports are connected through service lanes R lane 0 to R lane M−1, and data may be transmitted from the first chip module 100 to the second chip module 200. The L read ports and the L write ports are connected through service lanes W lane 0 to W lane L−1, and data may be transmitted from the second chip module 200 to the first chip module 100. The K first selection ports 111 and the K second selection ports are connected through service lanes lane 0 to lane K−1, so that data can be bidirectionally transmitted between the first chip module 100 and the second chip module 200. A specific transmission direction is implemented based on a specific function of the first selection port 111 and a specific function of the second selection port 211. For example, in a first selection port 111 and a second selection port 211 that are paired, if the first selection port 111 is a read port, the second selection port 211 is a write port, and data may be transmitted from the first chip module 100 to the second chip module 200; and in a first selection port 111 and a second selection port 211 that are paired, if the first selection port 111 is a write port, the second selection port 211 is a read port, and data may be transmitted from the second chip module 200 to the first chip module 100.

Figure 4:
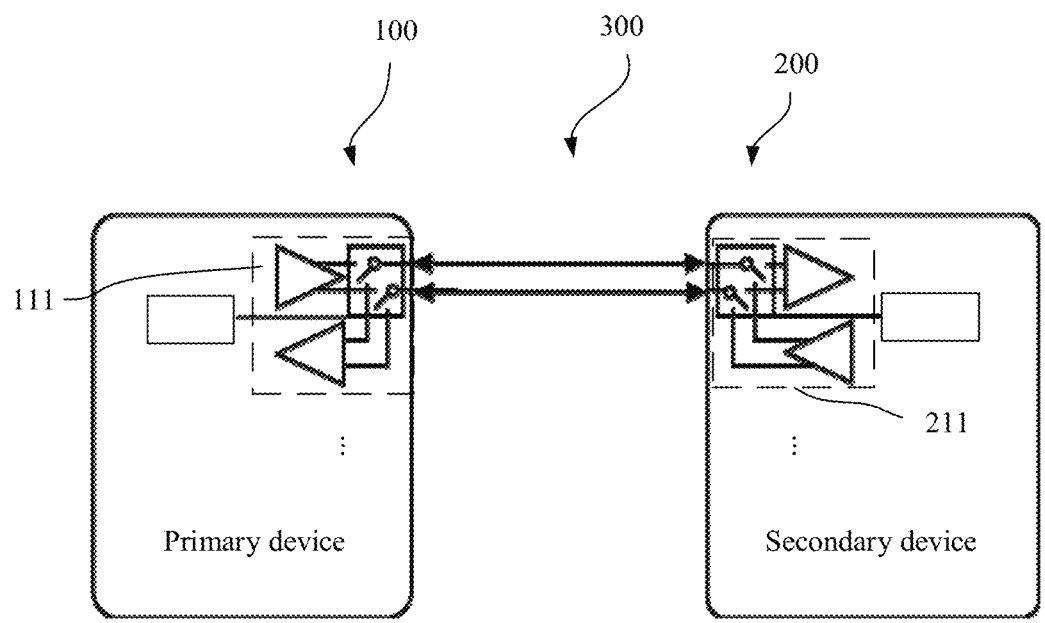
FIG. 4 is a block diagram of cooperation between a selection port of a first chip module and a selection port of a second chip module according to an embodiment of this application.

FIG. 4 is a schematic diagram of cooperation between the first selection port 111 of the first chip module and the second selection port 211 of the second chip module. The first selection port 111 and the second selection port 211 are connected by using a service lane of the parallel bus 300. The service lane shown in FIG. 4 is a bidirectional service lane, and the bidirectional service lane can transmit data from the first chip module 100 to the second chip module 200, or from the second chip module 200 to the first chip module 100.

Figure 5:
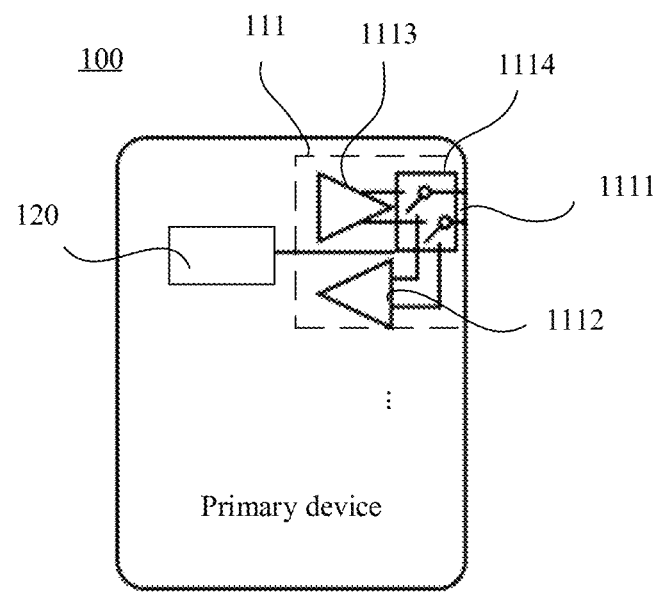
FIG. 5 is a block diagram of a structure of a first chip module according to an embodiment of this application.

FIG. 5 shows the first selection port of the first chip module in FIG. 4. The first selection port 111 includes: a first connection port 1111, a first receiving circuit 1112, a first sending circuit 1113, and a first selector switch 1114. The first connection port 1111 acts as an external port of the first selection port 111, and is configured to connect to a service lane of the parallel bus. The first receiving circuit 1112 is configured to implement a write function of the first selection port 111. When the first receiving circuit 1112 is connected to the first connection port 1111, the first selection port 111 acts as a write port. The first sending circuit 1113 is configured to implement a read function of the first selection port 111. When the first sending circuit 1113 is connected to the first connection port 1111, the first selection port 111 acts as a read port.

The first connection port 1111 is connected to the first receiving circuit 1112 and the first sending circuit 1113 by using the first selector switch 1114, and may be connected to either the first receiving circuit 1112 or the first sending circuit 1113 by using the first selector switch 1114. "Either . . . or" described above means selecting one of the first receiving circuit 1112 and the first sending circuit 1113 for connection. For example, the first connection port 1111 is connected to the first receiving circuit 1112 by using the first selector switch 1114, or the first connection port 1111 is connected to the first sending circuit 1113 by using the first selector switch 1114.

When the first connection port 1111 is connected to one of the first receiving circuit 1112 and the first sending circuit 1113, the first connection port 1111 is disconnected from the other circuit. For example, when the first connection port 1111 is connected to the first receiving circuit 1112, the first sending circuit 1113 is disconnected from the first connection port 1111; and the first receiving circuit 1112 is in an operating state, and the first sending circuit 1113 is in a non-operating state. When the first connection port 1111 is connected to the first sending circuit 1113, the first receiving circuit 1112 is disconnected from the first connection port 1111; and the first sending circuit 1113 is in an operating state, and the first receiving circuit 1112 is in a non-operating state. When the foregoing manner is used, a circuit in an operating state is totally isolated from a circuit in a non-operating state by using the first selector switch 1114, thereby preventing the circuit in the non-operating state from forming high parasitic capacitance and signal residual and from affecting sending or receiving performance of the operating circuit, and further improving a high-speed signal support capability of the first selection port 111. A signal rate supportable by the first selection port 111 can be increased to 25 Gbps or higher.

In an embodiment, the first selector switch 1114 may be a low-latency fast switch. For example, the first selector switch 1114 may be a transfer switch at a nanosecond level. A response time of the first selector switch 1114 is from 1 ns to 100 ns, such as 1 ns, 5 ns, 10 ns, 20 ns, 50 ns, 100 ns, or another different response time. Therefore, fast switching may be performed between the first sending circuit 1113 and the first receiving circuit 1112 by using the first selector switch 1114, and no significant delay is caused to a state switching procedure of the first selection port 111.

The first selector switch 1114 may be switches in different forms, to perform switching between the first receiving circuit 1112 and the first sending circuit 1113. For example, the first selector switch 1114 is a single-pole double-throw switch, a movable end of the first selector switch 1114 is connected to the first connection port 1111, and two non-movable ends are respectively connected to the first sending circuit 1113 and the first receiving circuit 1112 in one-to-one correspondence. For example, the first selector switch 1114 may be specifically a metal-oxide semiconductor field-effect transistor or another switch circuit that can implement switching between the first sending circuit 1113 and the first receiving circuit 1112.

Figure 6:
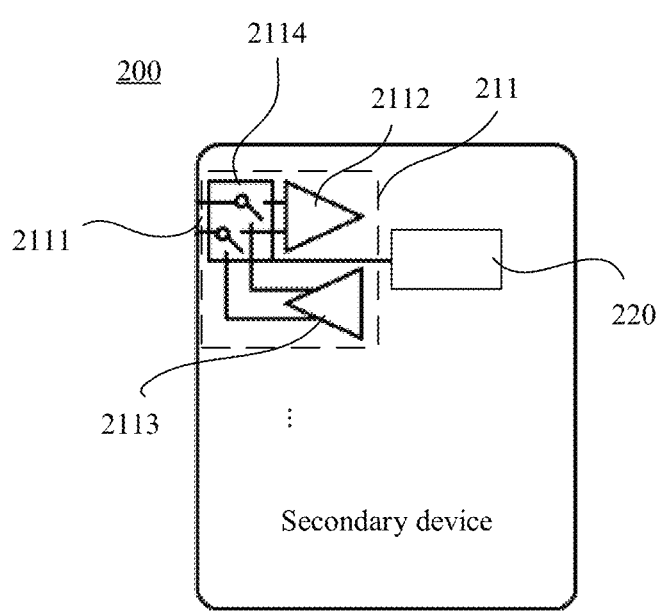
FIG. 6 is a block diagram of a structure of a second chip module according to an embodiment of this application.

FIG. 6 shows the second selection port of the second chip module in FIG. 4. The second selection port 211 includes: a second connection port 2111, a second receiving circuit 2112, a second sending circuit 2113, and a second selector switch 2114. The second connection port 2111 acts as an external port of the second selection port 211, and is configured to connect to a service lane in the parallel bus. The second receiving circuit 2112 is configured to implement a write function of the second selection port 211. When the second receiving circuit 2112 is connected to the second connection port 2111, the second selection port 211 acts as a write port. The second sending circuit 2113 is configured to implement a read function of the second selection port 211. When the second sending circuit 2113 is connected to the second connection port 2111, the second selection port 211 acts as a read port.

The second connection port 2111 is connected to the second receiving circuit 2112 and the second sending circuit 2113 by using the second selector switch 2114, and may be connected to either the second receiving circuit 2112 or the second sending circuit 2113 by using the second selector switch 2114. "Either . . . or" described above means selecting one of the second receiving circuit 2112 and the second sending circuit 2113 for connection. For example, the second connection port 2111 is connected to the second receiving circuit 2112 by using the second selector switch 2114, or the second connection port 2111 is connected to the second sending circuit 2113 by using the second selector switch 2114.

When the second connection port 2111 is connected to one of the second receiving circuit 2112 and the second sending circuit 2113, the second connection port 2111 is disconnected from the other circuit. For example, when the second connection port 2111 is connected to the second receiving circuit 2112, the second sending circuit 2113 is disconnected from the second connection port 2111; and the second receiving circuit 2112 is in an operating state, and the second sending circuit 2113 is in a non-operating state. When the second connection port 2111 is connected to the second sending circuit 2113, the second receiving circuit 2112 is disconnected from the second connection port 2111; and the second sending circuit 2113 is in an operating state, and the second receiving circuit 2112 is in a non-operating state. When the foregoing manner is used, a circuit in an operating state is totally isolated from a circuit in a non-operating state by using the second selector switch 2114, thereby preventing the circuit in the non-operating state from forming high parasitic capacitance and signal residual and from affecting sending or receiving performance of the operating circuit, and further improving a high-speed signal support capability of the second selection port 211. A signal rate supportable by the second selection port 211 can be increased to 25 Gbps or higher.

In an embodiment, the second selector switch 2114 may be a low-latency fast switch. For example, the second selector switch 2114 may be a transfer switch at a nanosecond level. A response time of the second selector switch 2114 is from 1 ns to 100 ns, such as 1 ns, 5 ns, 10 ns, 20 ns, 50 ns, 100 ns, or another different response time. Therefore, fast switching may be performed between the second sending circuit 2113 and the second receiving circuit 2112 by using the second selector switch 2114, and no significant delay is caused to a state switching procedure of the second selection port 211.

The second selector switch 2114 may be switches in different forms, to perform switching between the second receiving circuit 2112 and the second sending circuit 2113. For example, the second selector switch 2114 is a single-pole double-throw switch, a movable end of the second selector switch 2114 is connected to the second connection port 2111, and two non-movable ends are respectively connected to the second sending circuit 2113 and the second receiving circuit 2112 in one-to-one correspondence. For example, the second selector switch 2114 may be specifically a metal-oxide semiconductor field-effect transistor or another different switch circuit that can implement switching between the second sending circuit and the second receiving circuit.

Different operating states of the first selection port 111 and the second selection port 211 during data transmission are described with reference to FIG. 4, FIG. 5, and FIG. 6. When data needs to be transmitted from the first chip module 100 to the second chip module 200, the first selection port 111 acts as a read port, and the second selection port 211 acts as a write port. The first connection port 1111 is connected to the first sending circuit 1113 by using the first selector switch 1114, so that the first selection port 111 acts as a read port. The second connection port 2111 is connected to the second receiving circuit 2112 by using the second selector switch 2114, so that the second selection port 211 acts as a write port. When data needs to be transmitted from the second chip module 200 to the first chip module 100, the first selection port 111 acts as a write port, and the second selection port 211 acts as a read port. The first connection port 1111 is connected to the first receiving circuit 1112 by using the first selector switch 1114, so that the first selection port 111 acts as a write port. The second connection port 2111 is connected to the second sending circuit 2113 by using the second selector switch 2114, so that the second selection port 211 acts as a read port.

When the first selection port 111 and the second selection port 211 are switched, switching may be performed based on the transmit/receive requirement of the first chip module. In this embodiment of this application, the first chip module may be further configured to: determine transmit and receive operation requirements for a future time period; compare the transmit and receive operation requirements with a current transmit/receive state; mark, based on a comparison result, a location of an I/O port whose state needs to be changed; and initiate state switching of a specified I/O port of the first chip module and state switching of a specified I/O port of the peer second chip module (for example, a memory) within a time period by using a preset control mechanism, to match an actual service data transmit/receive requirement for a next time period. In determining the transmit and receive operation requirements for a future time period by the first chip module, an upper-layer chip or software of the communication system in which the first chip module is located may indicate that a transmit/receive port of the first chip module does not meet a service requirement, and indicate a specific adjustment policy. Alternatively, the first chip module performs adjustment based on a mismatch between a service requirement of current information transmission and port allocation. For example, when the first chip module finds that to-be-received data is queued at a port, and there is an idle port for sending data, a port of the first chip module is adjusted based on data to be received and sent.

The foregoing preset control mechanism is obtaining a required quantity and locations of write ports and a required quantity and locations of read ports based on the transmit/receive requirement of the first chip module; and compare the required quantity and the locations of write ports and the required quantity and the locations of read ports with a current quantity and locations of write ports and a current quantity and locations of read ports, to determine a first selection port that needs to be switched. For example, the first chip module has N ports, and the N ports are respectively a $0^{th}$ port to an $(N-1)^{th}$ port. The quantity of write ports and the quantity of read ports determined based on the transmit/receive requirement of the first chip module are respectively M and L, where M+L=N. The $0^{th}$ port to an $M^{th}$ port are read ports, and an (M+1)th port to the $(N-1)^{th}$ port are write ports. Among the current N ports of the first chip module, the $0^{th}$ port to an $(M-a)^{th}$ port are read ports, and an $(M-(a+1))^{th}$ port to the $(N-1)^{th}$ port are write ports. During switching, it is determined that the $(M-(a+1))^{th}$ port to the $M^{th}$ port need to be switched from write ports to read ports. N, M, L, and a described above are all positive integers greater than 1.

When the first selection port is controlled, the first chip module further includes a first control module 120, and the first chip module controls, by using the first control module 120, the first selection port to be switched to a write port or a read port, to match the transmit/receive requirement of the first chip module. Specifically, the first control module 120 may control, based on the transmit/receive requirement (the transmit and receive operation requirements for a further time period in the foregoing example) of the first chip module, the first selector switch to switch at least some of the first selection ports to write ports, or switch at least some of the first selection ports to read ports.

During specific switching, a current ratio of transmit ports to receive ports among the first ports of the first chip module needs to be compared with the transmit/receive requirement of the first chip module, to perform targeted adjustment. Therefore, the first control module 120 provided in this embodiment of this application is further configured to obtain a required ratio of write ports to read ports as a target ratio based on the transmit/receive requirement of the first chip module, and the target ratio is a ratio of the quantity of write ports to the quantity of read ports.

The first control module 120 is further configured to determine a current ratio of write ports to read ports in the first chip module, and the current ratio is a ratio of the current quantity of write ports to the current quantity of read ports. The current quantity of write ports is a sum of a quantity of write ports among the fixed ports and a quantity of some or all of the first selection ports acting as write ports; the current quantity of read ports is a sum of a quantity of read ports among the fixed ports and a quantity of some or all of the first selection ports acting as read ports.

When the first control module 120 controls switching, the following several states are included:

(1) When the current ratio is consistent with the target ratio, the first control module 120 does not control the first selection port to switch an operating state. The first selector switch does not act, and each first selection port still maintains an existing operating state.

(2) When the current ratio is different from the target ratio, the first control module 120 is configured to control, based on a result of comparison between the target ratio and the current ratio, the first selector switch to switch the first selection port, until the ratio of read ports to write ports of the first chip module is consistent with the target ratio.

The following two cases may be included: a. When the current ratio is less than the target ratio, the first control module controls at least some of the first selection ports acting as read ports to be switched to write ports, until the ratio of the quantity of write ports to the quantity of read ports is equal to the target ratio. b. When the current ratio is greater than the target ratio, the first control module controls at least some of the first selection ports acting as write ports to be switched to read ports, until the ratio of the quantity of write ports to the quantity of read ports is equal to the target ratio.

During specific switching, the first control module 120 is configured to: obtain the required quantity and the locations of write ports and the required quantity and the locations of read ports based on the transmit/receive requirement of the first chip module; compare the required quantity and the locations of write ports and the required quantity and the locations of read ports with the current quantity and the locations of write ports and the current quantity and the locations of read ports, to determine a first selection port 111 that needs to be switched; and switch the determined first selection port 111 based on the transmit/receive requirement of the first chip module 100. FIG. 3 is used as an example. When the K first selection ports 111 are sorted, a specific first selection port 111 that needs to be switched is determined based on the transmit/receive requirement of the first chip module 100, and a location of the first selection port 111 that needs to be switched is determined. For example, when it is determined that a $(K-1)^{th}$ first selection port 111 needs to be switched, a location of the $(K-1)^{th}$ first selection port 111 is determined, and after the location is determined, the $(K-1)^{th}$ first selection port 111 is controlled to be switched.

When the first chip module 100 performs switching, the second selection port 211 of the corresponding second chip module 200 is also correspondingly switched. During specific switching, a second control module 220 controls, based on the transmit/receive requirement of the first chip module 100, the second selection port 211 to be switched to a read port or a write port, to match the transmit/receive requirement of the first chip module 100.

When the first chip module and the second chip module perform switching, the first chip module and the second chip module need to exchange information. In an optional solution, the first control module 120 is further configured to: send a switching indication message to the second chip module 200, and receive a switching completion indication message fed back by the second chip module 200. After the second control module 220 receives the switching indication message sent by the first chip module 100, the second control module 220 is further configured to control the corresponding second selection port 211 to be switched to a read port or a write port. After switching is completed, the second control module 220 is further configured to send the switching completion indication message to the first control module. This implements information interaction between the first chip module 100 and the second chip module 200, and ensures that the first selection port 111 and the second selection port 211 that are paired can be correspondingly switched.

To facilitate understanding of switching to a write port or a read port for the first ports of the first chip module provided in this embodiment of this application, descriptions are provided below in detail with reference to the flowcharts shown in the accompanying drawings. In a method procedure described below, a primary device is the first chip module, and a secondary device is the second chip module.

Figure 7:
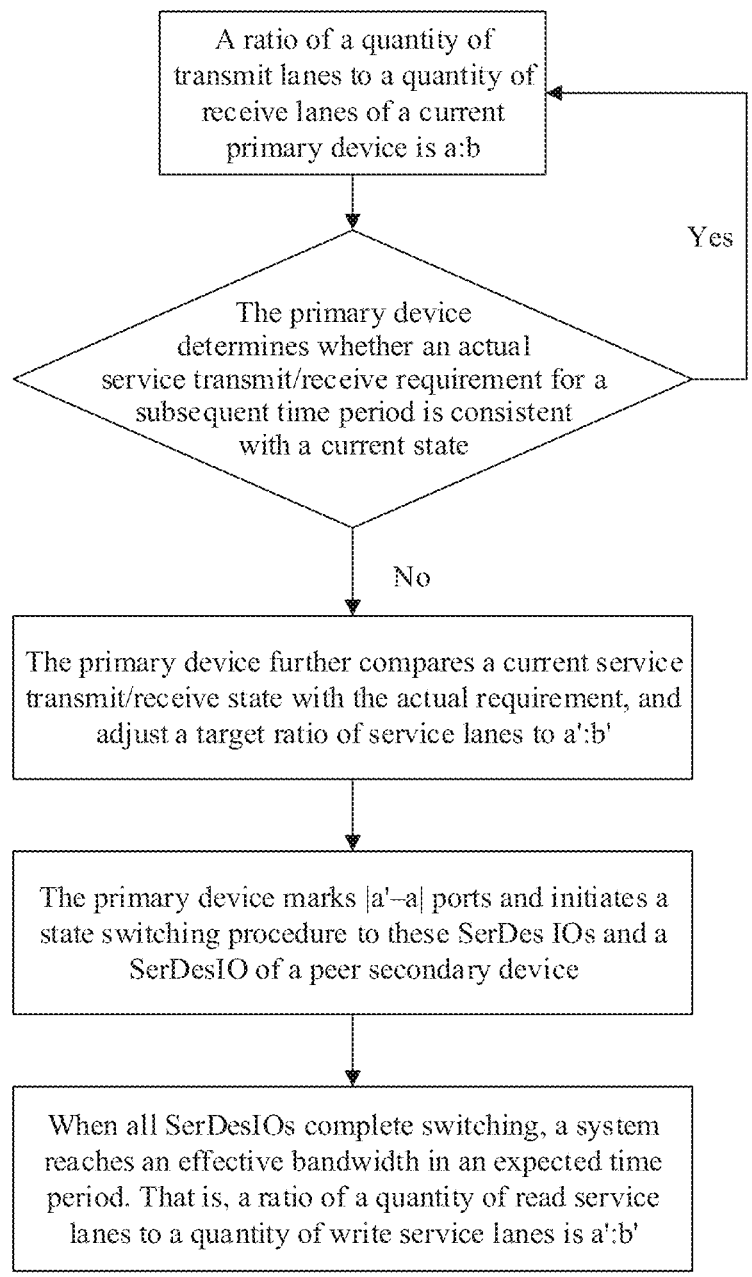
FIG. 7 is a schematic flowchart of switching a selection port according to an embodiment of this application.

FIG. 7 describes a method procedure in which the first ports of the first chip module may be dynamically allocated. It is assumed that in a current state, a ratio of first ports that are respectively used for receive and transmit services of the primary device is a:b (then, a ratio of receive ports to transmit ports of the secondary device is b:a). To be specific, there are a*n Rx ports (e.g., write ports) and b*n Tx ports (e.g., read ports) among the first ports of the primary device. For the secondary device, when the ratio of first ports that are respectively used for receive and transmit services of the primary device is a:b, the ratio of receive ports to transmit ports of the secondary device is b:a. To be specific, there are a*n Tx ports and b*n Rx ports among the second ports of the secondary device. Based on the port allocation method, the following operations are performed:

Operation 001: Obtain a transmit/receive requirement of the primary device.

The primary device predicts, based on a service requirement plan, a receiving bandwidth or a sending bandwidth required for a future time period, to obtain a required quantity of write ports and a required quantity of read ports. The foregoing primary device has an existing function of determining transmit and receive operation requirements for the future time period. Therefore, details are not described herein again.

Operation 002: Switch a first selection port of the primary device to a read port or a write port based on the transmit/receive requirement of the primary device, until the transmit/receive requirement of the primary device is matched.

In an embodiment, the primary device determines whether an actual service transmit/receive requirement (also referred to as a target ratio) for a subsequent time period is consistent with a current state (also referred to as a current ratio). If the actual service transmit/receive requirement for the subsequent time period is consistent with the current state, the following operations are not performed. If the actual service transmit/receive requirement for the subsequent time period is inconsistent with the current state, the required ratio of write ports to read ports is obtained as the target ratio based on the transmit/receive requirement of the primary device. Details of a current transmit/receive state of the primary device are determined, and it is determined that the current ratio of write ports to read ports in the current primary device is a:b. To further compare the current service transmit/receive state with the actual requirement, and adjust a target ratio of service lanes to a':b', the target ratio of service lanes is also the target ratio of write ports to read ports among the first ports correspondingly.

When the current ratio is different from the target ratio, the first selection port is controlled, based on a result of comparison between the target ratio and the current ratio, to be switched to a read port or a write port, until the ratio of read ports to write ports of the primary device is consistent with the target ratio. When the two ratios are different, first selection ports are marked and a state switching procedure is initiated. In addition, a state switching procedure is initiated to a SerDes I/O port (that is, a second selection port) of the peer secondary device.

Before switching is performed, a first selection port that needs to be switched is determined, and the determined first selection port is switched based on the transmit/receive requirement of the chip module. For example, a specific first selection port remaining in the current state and a specific first selection port whose state needs to be switched are determined. During switching, a state is switched only for the determined first selection port that needs to be switched.

During specific switching, a first control module controls a first selector switch in the first selection port whose state needs to be switched to perform switching, and after the switching procedure, the primary device completes state switching of its own first port and starts to enter a service transmit/receive stage.

When the first selection port of the primary device is switched, the secondary device also completes state switching of a second selection port of the secondary device and starts to enter a service transmit/receive stage. Switching of the second selection port of the secondary device matches switching of the first selection port of the primary device.

When all SerDes I/O ports complete switching, the system reaches an effective bandwidth in an expected time period. That is, a ratio of a quantity of read service lanes to a quantity of write service lanes is a':b'.

Port switching of the primary device and the secondary device in the foregoing descriptions may be determined by using a plurality of mechanisms. Which device is the primary device and which device is the secondary device may be configured and determined in advance. Alternatively, for two peer devices, which device is the primary device and which device is the secondary device for a time period may be determined by using a specific negotiation mechanism. In the switching procedure in the foregoing descriptions, arbitration may be led by the primary device, or may be jointly completed by the peer devices through handshake negotiation. The primary device may always monitor an actual service requirement for a future time period and perform necessary adjustment on the current transmit/receive state in real time. The different manners are described below in detail.

Figure 8:
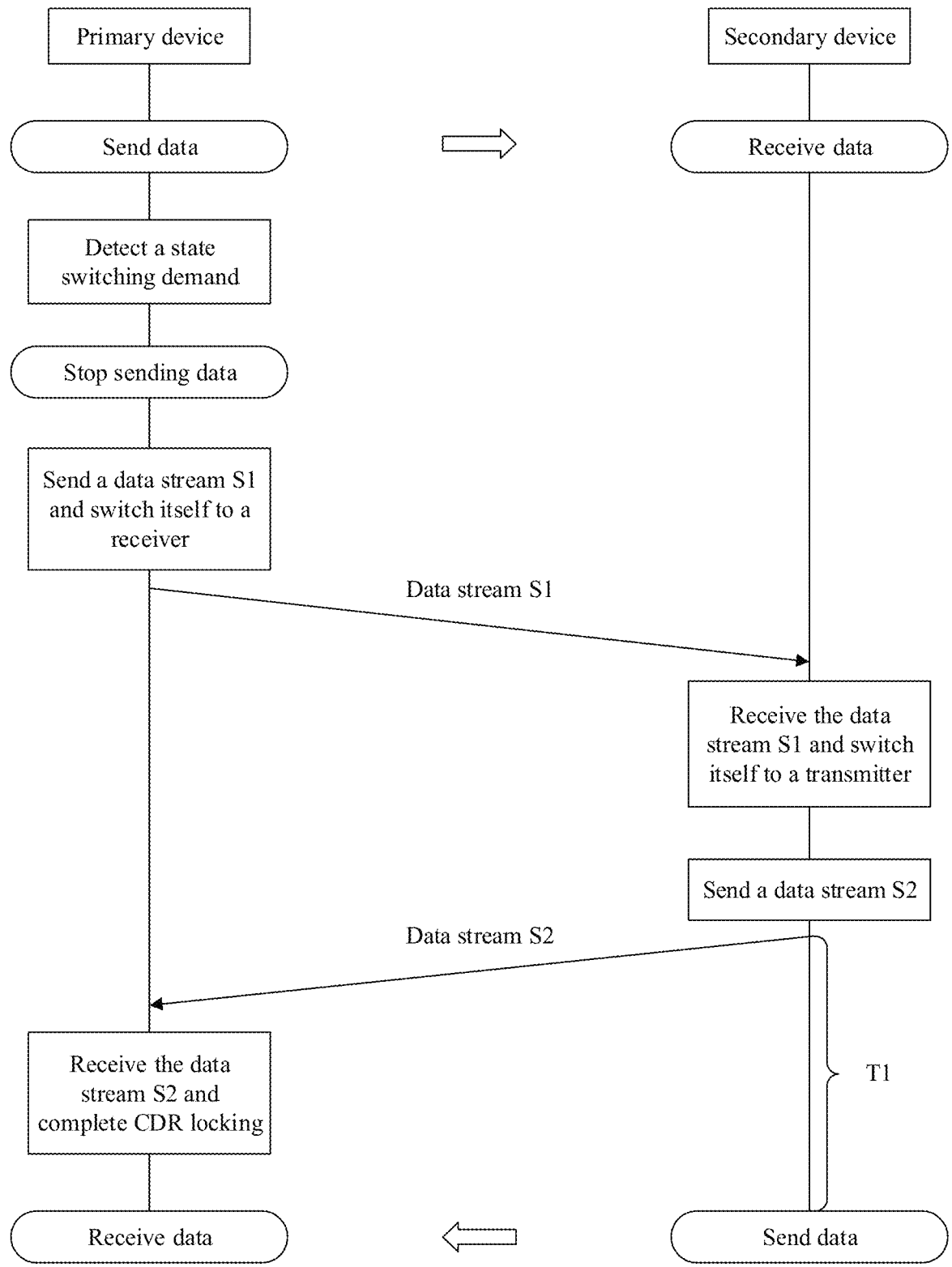
FIG. 8 is another schematic flowchart of switching a selection port according to an embodiment of this application.

FIG. 8 shows a specific method in which the primary device and the secondary device perform the port switching procedure through in-band management. An example in which a first selection port of the primary device is a read port and a second selection port of the secondary device is a write port is used for description. In the following descriptions, a Tx port may also be referred to as a transmitter and an Rx port may also be referred to as a receiver.

It is assumed that, on a service lane (for example, a differential link) in the current state, the primary device sends data, and the peer secondary device receives the data. That is, a corresponding first selection port of the primary device is a Tx port, and a corresponding second selection port of the peer secondary device is an Rx port.

When the primary device monitors the transmit/receive state switching requirement and specifies that the service lane needs to be switched to a state in which the peer end (e.g., the second selection port) performs sending and the primary device (e.g., the first selection port) performs receiving, and when the primary device detects a state switching demand, the Tx port stops sending a service data packet (e.g., stops data sending), but sends, to the secondary device, a special bitstream S1 that requests to switch the Rx port of the peer end to a Tx port. The bitstream S1 is different from all other bitstreams defined by the current system, has a specific format, and can be identified by the secondary device. Specific sending is controlled by a first control module. In this case, the first control module is further configured to send a switching indication message (the bitstream S1) to the secondary device paired with the primary device.

After the switching indication message (the bitstream S1) is sent, the first selection port of the primary device is switched from the Tx port to an Rx port, and is in a receiving waiting state after the switching is completed. The foregoing switching is also controlled by using the first control module. That is, after the first control module controls the first selector switch to send the bitstream S1, the first control module controls the first selector switch to switch an operating state of the first selection port.

The second selection port of the secondary device is originally in an Rx port state, and after receiving the bitstream S1 sent by the primary device, is enabled to be switched from the Rx port to a Tx port. When the secondary device performs switching, the switching is controlled by using the second control module. After receiving the switching indication message sent by the primary device paired with the secondary device, the second control module controls the second selection port to be switched to a read port or a write port. In the procedure shown in FIG. 8, the second control module controls the second selection port to be switched to a read port.

After completing switching, the secondary device starts to send a special bitstream S2 that is used for CDR (clock data recovery) locking to the primary device. The bitstream S2 is different from all other bitstreams defined by the current system, has a specific format, and can be identified by the primary device. The bitstream S2 may be used as a switching completion indication message. The bitstream S2 is also sent by using the second control module. After the second selection port is switched, the second control module sends the bitstream S2 to the primary device.

After receiving the bitstream S2 sent by the secondary device, the primary device starts the CDR locking until completion. After a time period T1 (>0) following completion of sending the bitstream S2 by the secondary device, the secondary device starts to send service data to the primary device. In this case, the first selection port and the second selection port at both ends of the service lane have completed state switching, and start service communication.

It should be understood that, the procedure example shown in FIG. 8 is one of specific manners of implementing state switching of an I/O port. In addition to performing a handshake by using an in-band bitstream, the primary device and the secondary device may perform communication and determining by using an out-of-band control signal.

Figure 9:
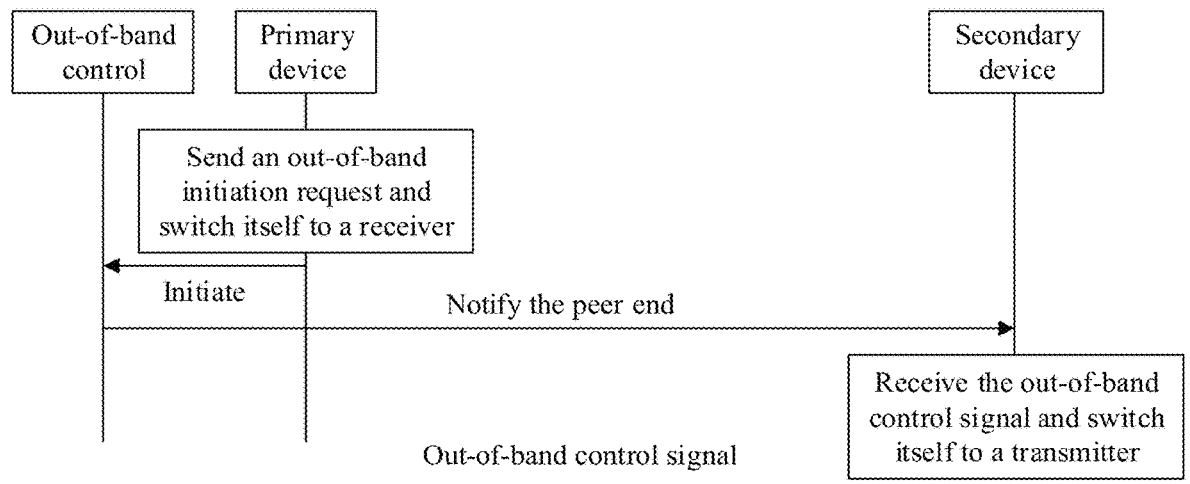
FIG. 9 is another schematic flowchart of switching a selection port according to an embodiment of this application.

FIG. 9 is a flowchart of performing communication and determining by the primary device and the secondary device by using an out-of-band control signal. Different from the procedure shown in FIG. 8, in a procedure shown in FIG. 9, a different device sends the bitstream S1. In FIG. 8, the bitstream S1 is sent by using the first control module. However, in FIG. 9, the bitstream S1 is sent through out-of-band control. In this case, in addition to the first control module and the second control module that are included, the system further includes a third control module. The third control module acts as an out-of-band control module, and is separately connected to the first control module of the primary device and the second control module of the secondary device. During use, the third control module is configured to: when the first control module controls a first selector switch of a first selection port to perform switching, send a switching indication message (the bitstream S1) to the secondary device paired with the primary device. In other words, the first control module no longer sends the bitstream S1, but the third control module sends the bitstream S1. In this way, switching between the primary device and the secondary device can also be implemented.

In the procedures shown in FIG. 8 and FIG. 9, a state of the first selection port and a state of a second selection port are almost synchronously switched. However, in the system provided in this embodiment of this application, the state of the first selection port and the state of the second selection port may alternatively be switched asynchronously. That is, after one end notifies a peer end in an in-band or out-of-band manner that state switching is completed, the other end starts state switching.

Figure 10:
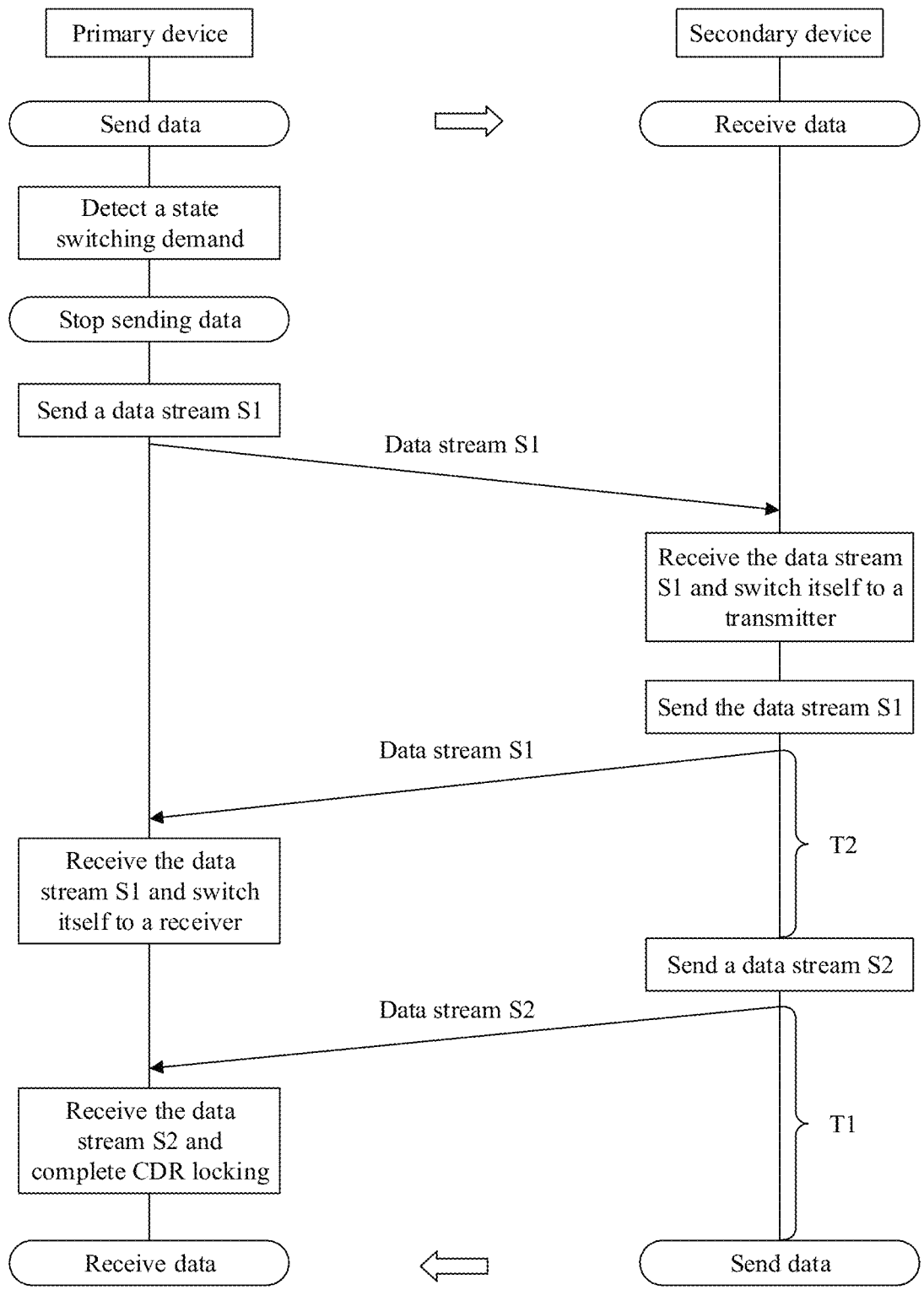
FIG. 10 is another schematic flowchart of switching a selection port according to an embodiment of this application.

FIG. 10 is a schematic flowchart of asynchronous state switching by a first selection port and a second selection port. Initial states of a primary device and a secondary device in FIG. 10 are the same as initial states of the primary device and the secondary device in the flowchart shown in FIG. 9. The primary device sends a bitstream S1 (a first switching indication message) to the secondary device, and the secondary device performs switching to switch the second selection port to a transmit port. After performing switching, the second selection port sends a bitstream S1 (a second switching indication message) to the primary device. After receiving the bitstream S1, the primary device controls the first selection port to be switched to a write port. A waiting time after the secondary device sends the bitstream S1 is T2, where T2 (>0) is a waiting time between a time at which the secondary device requests the primary device to perform state switching and a time at which the secondary device sends a bitstream for CDR locking. After the waiting time T2, the secondary device sends a bitstream S2 (a switching completion indication message). After a time period T1 (>0) following completion of sending the bitstream S2 by the secondary device, the secondary device starts to send service data to the primary device. In this case, the first selection port and the second selection port at both ends of a service lane have completed state switching, and start service communication.

For a system corresponding to the procedure shown in FIG. 10, the bitstream S1 may be further sent through out-of-band control (a third control module) set by the system. The third control module is configured to send the first switching indication message to a second control module, and send the second switching indication message to a first control module after receiving the second switching indication message fed back by the second control module. The first control module is further configured to control, after receiving the second switching indication message, a transfer switch of the first selection port to perform switching.

It can be learned from the foregoing descriptions that, the system provided in this embodiment of this application may send or receive a resource by using an I/O port that can be dynamically allocated. The primary device in the system may monitor a service transmit/receive requirement for a future time period; compare the service transmit/receive requirement with a current state; mark, based on a comparison result, a location of an I/O port whose state needs to be changed; and initiate state switching of a specified I/O port of the primary device and state switching of a specified I/O port of the peer secondary device at a determined time by using a preset control mechanism, to match an actual service transmit/receive requirement for a next time period, thereby maximizing an effective bandwidth. In the foregoing process, the primary device may continuously monitor a service lane and repeatedly initiate a switching procedure as required. Therefore, dynamic resource allocation of I/O ports is implemented, randomness in sending and receiving service data is better matched, utilization of I/O ports of a chip is increased, and design complexity of a PCB is reduced.

In addition, in an I/O port, a low-latency (at a level of several nanoseconds) fast switch is used to perform switching between a sending circuit and a receiving circuit. In this way, when a circuit operates in a specific state, a circuit in another state causes no adverse impact of parasitic capacitance and a signal stub on the current operating circuit due to switch disconnection, thereby greatly improving quality of a signal sent or received by the operating circuit of the I/O port and increasing a supportable high-speed signal rate to 25 Gbps or higher. In addition, no significant adverse impact is caused to a system latency.

With reference to FIG. 7, FIG. 8, FIG. 9, and FIG. 10, an embodiment of this application provides a port allocation method of a primary device. The allocation method includes the following operations.

Operation 001: Obtain a transmit/receive requirement of the primary device.

For details, refer to the related descriptions in FIG. 7, FIG. 8, FIG. 9, and FIG. 10.

Operation 002: Switch a first selection port of the primary device to a read port or a write port based on the obtained transmit/receive requirement of the primary device.

Specifically, a required ratio of write ports to read ports is obtained as a target ratio based on the transmit/receive requirement of the primary device.

A current ratio of write ports to read ports in the current primary device is determined.

When the current ratio is different from the target ratio, the first selection port is controlled, based on a result of comparison between the target ratio and the current ratio, to be switched to a read port or a write port, until the ratio of read ports to write ports of the primary device is consistent with the target ratio.

Before switching is performed, a first selection port that needs to be switched is determined, and the determined first selection port is switched based on the transmit/receive requirement of the primary device. A transmit/receive state of the corresponding first selection port is adjusted based on the transmit/receive requirement of the primary device.

In a switching process, a switching indication message is sent to a peer secondary device paired with the primary device; and a switching completion indication message fed back by the secondary device is received. It should be understood that the switching indication message may be sent before or after switching. This is not specifically limited in this embodiment of this application.

In the foregoing technical solution, the first selection port may selectively act as a read port or a write port, so that switching can be performed based on an operating state of the primary device, thereby increasing a read/write bandwidth of the primary device. In addition, a first control module controls an operating state of the first selection port, to flexibly adjust a quantity of read ports and a quantity of write ports of the primary device.

With reference to FIG. 7, FIG. 8, FIG. 9, and FIG. 10, an embodiment of this application provides a port allocation method of a secondary device. The allocation method includes the following operations.

Operation 001: Obtain a transmit/receive requirement of a primary device.

For details, refer to the related descriptions in FIG. 7, FIG. 8, FIG. 9, and FIG. 10.

Operation 002: Switch a second selection port of the secondary device to a read port or a write port based on the transmit/receive requirement of the primary device.

Specifically, after a switching indication message sent by the primary device is received, the corresponding second selection port is controlled to be switched to a read port or a write port; and after switching is completed, a switching completion indication message is sent to the primary device. For details of switching and information interaction, refer to the related descriptions in FIG. 7, FIG. 8, FIG. 9, and FIG. 10.

Figure 11:
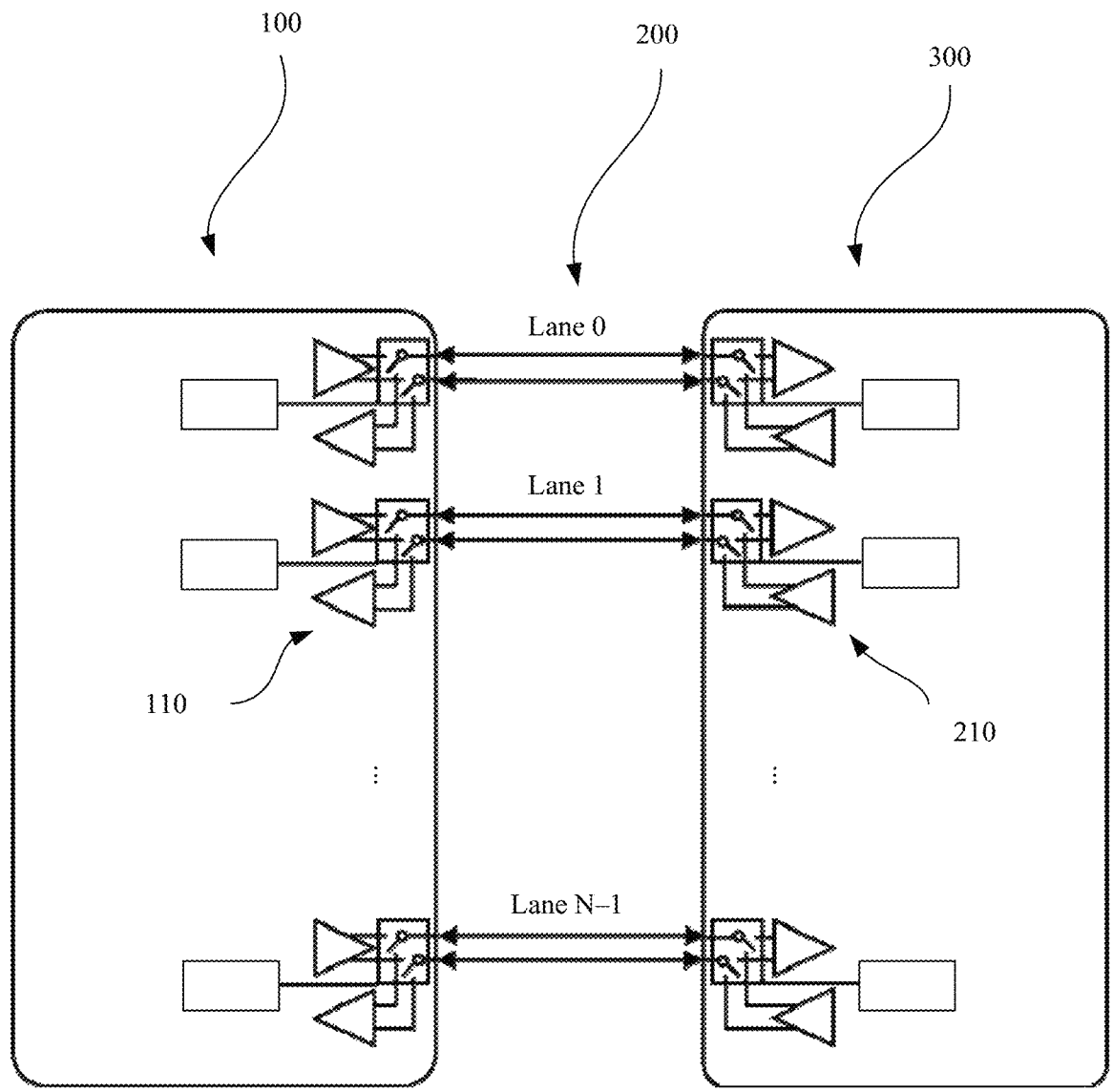
FIG. 11 is a block diagram of a structure of another communication system according to an embodiment of this application.

FIG. 11 shows another communication system according to an embodiment of this application. A first chip module 100 and a second chip module 200 shown in FIG. 11 differ from the first chip module 100 and the second chip module 200 shown in FIG. 3 in a quantity of first selection ports. In FIG. 11, each of a plurality of first ports 110 is a first selection port. All the ports may be switched to write ports or read ports. Similarly, each of a plurality of second ports 210 is a second selection port. All the ports may be switched to write ports or read ports. During switching, transmit ports and receive ports may be matched at any ratio. For a port switching manner of the system shown in FIG. 11, refer to the port switching manner of the system shown in FIG. 2. Details are not described herein again.

It can be learned from the foregoing descriptions that, in a port settings manner of the communication system provided in this embodiment of this application, ports of the first chip module 100 and ports of the second chip module 200 may be arranged in such a manner that at least some or all of the plurality of first ports 110 are first selection ports, and at least some or all of the plurality of corresponding second ports 210 are second selection ports. The system shown in FIG. 11 may be used when reading ports and writing ports need to be matched at any ratio. In consideration that an I/O port has high design complexity and a high power in the foregoing implementation, the solution shown in FIG. 2 may also be used depending on a service status in an actual application scenario. An inherent data sending service or data receiving service is carried through a unidirectional service lane, a value of L or M may be determined depending on the actual application scenario, and another service lane whose state can be switched is used for dynamic allocation, to achieve a larger effective bandwidth. Therefore, different types of I/O ports may be adapted for different application scenarios. All ports may support state switching to adapt to a random reading/writing scenario in all service lanes. Alternatively, with reference to an actual situation, I/O ports with bidirectional transmission and those with unidirectional transmission may be mixed, to reduce design complexity to some extent and reduce power consumption.

In a variant example, the communication system may further include only the foregoing first chip module, and the second chip module uses another implementation; or the communication system may further include only the foregoing second chip module, and the first chip module uses another implementation, provided that a reading/writing service lane in the communication system can be flexibly adjusted.

This application further provides a chip module. The chip module includes a plurality of first ports and a first control module. At least some of the plurality of first ports are first selection ports, and the first selection ports each can act as a read port or a write port. The first control module controls, based on a transmit/receive requirement of the chip module or a received switching instruction, the first selection port to be switched to a read port or a write port, to match the transmit/receive requirement of the chip module. For the first ports and the first selection ports of the chip module, refer to the first ports and the first selection ports of the foregoing first chip module. Details are not described herein again.

When the chip module controls port switching, the received switching instruction comes from a peer chip module. Alternatively, adjustment is performed based on the transmit/receive requirement of the chip module. During switching, the first control module is configured to: after receiving a switching indication message sent by the peer chip module, control the corresponding first selection port to be switched to a read port or a write port; and after switching is completed, the first control module is further configured to send a switching completion indication message to the first control module. For a function of the first control module, refer to the specific function of the first control module in the foregoing first chip module. Details are not described herein again.

During specific switching, the first control module is further configured to: obtain a required ratio of write ports to read ports as a target ratio based on the transmit/receive requirement of the chip module; determine a current ratio of write ports to read ports in the current chip module; and when the current ratio is different from the target ratio, control, based on a result of comparison between the target ratio and the current ratio, the first selection port to be switched to a read port or a write port, until the ratio of read ports to write ports of the chip module is consistent with the target ratio. For details, refer to the process of controlling port switching by the first control module in the foregoing first chip module. Details are not described herein again.

The first selection port is a port whose state may be switched, and each first selection port includes: a first connection port, a first receiving circuit, a first sending circuit, and a first selector switch. The first connection port is connected to either the first receiving circuit or the first sending circuit by using the first selector switch. When the first receiving circuit is connected to the first connection port, the first selection port acts as a write port. When the first sending circuit is connected to the first connection port, the first selection port acts as a read port. For details, refer to the first selection port in the first chip module. Details are not described herein again.

An embodiment of this application further provides a mobile terminal. The mobile terminal includes the chip module in any one of the foregoing embodiments and a peer chip module connected by using a signal. A disposed first selection port may selectively act as a read port or a write port, so that switching can be performed based on an operating state of the chip module, thereby increasing a read/write bandwidth of a communication system. In addition, when the first selection port acts as a read port, a receiving circuit is totally disconnected from a connection port. Similarly, when the first selection port acts as a write port, a sending circuit is totally disconnected from the connection port. In this way, impact of an idle circuit on the first selection port is avoided, and working effect of the communication system is improved.

Figure 12:
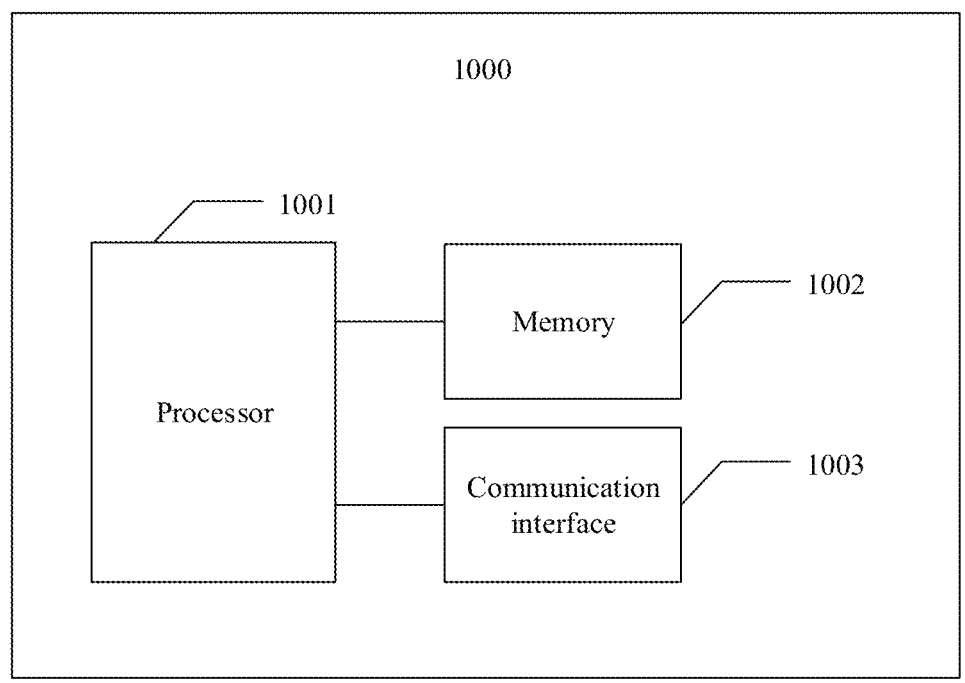
FIG. 12 is a block diagram of a structure of a signal processing module according to an embodiment of this application.

As shown in FIG. 12, an embodiment of this application further provides a signal processing module 1000 for implementing the function of the foregoing method. The signal processing module 1000 may be a communication device, or may be an apparatus in a communication device. The signal processing module 1000 includes at least one processor 1001 for implementing the function of the apparatus in the foregoing method. For example, the processor 1001 may be configured to control, based on an obtained transmit/receive requirement of a first chip module, a communication interface 1003 (a first selection port) to perform state switching. For details, refer to the detailed descriptions in the method. Details are not described herein again.

In some embodiments, the signal processing module 1000 may further include at least one memory 1002 for storing program instructions and/or data. The memory 1002 is coupled to the processor 1001. Coupling in embodiments of this application is indirect coupling or a communication connection between apparatuses, units, or modules for information exchange between the apparatuses, the units, or the modules, and may be in electrical, mechanical, or other forms. In another implementation, the memory 1002 may alternatively be located outside the signal processing module 1000. The processor 1001 may cooperate with the memory 1002. The processor 1001 may execute the program instructions stored in the memory 1002. At least one of the at least one memory may be included in the processor.

In some embodiments, the signal processing module 1000 includes the communication interface 1003 for communicating with another device by using a transmission medium, so that the apparatus in the signal processing module 1000 may communicate with the another device. For example, the communication interface 1003 may be a transceiver, a circuit, a bus, a module, or a communication interface of another type, and the another device may be a network device, another terminal device, or the like. The processor 1001 receives and sends data by using the communication interface 1003, and is configured to implement the method in the foregoing embodiment. For example, the communication interface 1003 may be configured to transfer a signal.

A connection medium between the communication interface 1003, the processor 1001, and the memory 1002 is not limited in this embodiment of this application. For example, in this embodiment of this application, in FIG. 12, the memory 1002, the processor 1001, and the communication interface 1003 may be connected by using a bus, and the bus may be classified into an address bus, a data bus, a control bus, or the like.

In embodiments of this application, the processor may be a general-purpose processor, a digital signal processor, an application-specific integrated circuit, a field programmable gate array or another programmable logic device, a discrete gate or transistor logic device, or a discrete hardware component, and may implement or perform the methods, operations, and logical block diagrams disclosed in embodiments of this application. The general-purpose processor may be a microprocessor, or may be any conventional processor or the like. The operations of the method disclosed with reference to embodiments of this application may be directly performed by a hardware processor, or may be performed by a combination of hardware and software modules in the processor.

In an embodiment of this application, the memory may be a non-volatile memory, such as a hard disk drive (HDD) or a solid-state drive (SSD), or may be a volatile memory, for example, a random access memory (RAM). The memory is any other medium that can carry or store expected program code in a form of an instruction or a data structure and that can be accessed by a computer, but is not limited thereto. The memory in embodiments of this application may alternatively be a circuit or any other apparatus that can implement a storage function, and is configured to store the program instructions and/or the data.

All or some of the methods in embodiments of this application may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, the procedure or functions according to embodiments of this application are all or partially generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, an SSD), or the like.

It is clearly that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A chip module, comprising:
    a plurality of first ports, wherein at least some of the plurality of first ports are first selection ports that can be configured as a read port or a write port; and
    a first control module configured to control, based on a transmit/receive requirement of the chip module, at least one of the first selection ports to be switched to a read port or a write port to match the transmit/receive requirement of the chip module,
    wherein when a current ratio is different from a target ratio, the first control module is configured to control the at least one first selection port to be switched to a read port or a write port, until a ratio of read ports to write ports of the chip module is consistent with the target ratio.

2. The chip module according to claim 1, wherein the first control module is further configured to:
    obtain a required ratio of write ports to read ports as the target ratio based on the transmit/receive requirement of the chip module, and
    determine the current ratio of write ports to read ports in the chip module.

3. The chip module according to claim 2, wherein the first control module is further configured to:
    obtain a required quantity and locations of write ports and a required quantity and locations of read ports based on the transmit/receive requirement of the chip module; and
    compare the required quantity and the locations of write ports and the required quantity and the locations of read ports with a current quantity and locations of write ports and a current quantity and locations of read ports, to determine the at least one first selection port that needs to be switched.

4. The chip module according to claim 3, wherein the first control module is further configured to:
   determine that the at least one first selection port needs to be switched, and
   switch the at least one first selection port based on the transmit/receive requirement of the chip module.

5. The chip module according to claim 4, wherein the first control module is further configured to:
   when the current ratio is less than the target ratio, control at least some of the first selection ports acting as read ports to be switched to write ports; or
   when the current ratio is greater than the target ratio, control at least some of the first selection ports acting as write ports to be switched to read ports.

6. The chip module according to claim 1, wherein each first selection port comprises: a first connection port, a first receiving circuit, a first sending circuit, and a first selector switch; the first connection port is connected to one of the first receiving circuit and the first sending circuit by using the first selector switch;
   when the first receiving circuit is connected to the first connection port, the first selection port is configured as a write port; and
   when the first sending circuit is connected to the first connection port, the first selection port is configured as a read port.

7. The chip module according to claim 1, wherein the first control module is further configured to:
   send a switching indication message to a peer chip module paired with the chip module, and
   receive a switching completion indication message fed back by the peer chip module.

8. A communication system, comprising:
   a first chip module and a second chip module, wherein the first chip module comprises:
      a plurality of first ports, wherein at least some of the plurality of first ports are first selection ports that can be configured as a read port or a write port, and
      a first control module configured to control, based on a transmit/receive requirement of the first chip module, at least one of the first selection ports to be switched to a read port or a write port, to match the transmit/receive requirement of the first chip module;
   wherein the first ports of the first chip module and a plurality of second ports of the second chip module are connected in a one-to-one correspondence,
   wherein when a current ratio is different from a target ratio, the first control module is configured to control the at least one first selection port to be switched to a read port or a write port, until a ratio of read ports to write ports of the first chip module is consistent with the target ratio.

9. The communication system according to claim 8, wherein the second chip module further comprises a second control module, wherein
   at least some of the plurality of second ports are second selection ports; and
   the second control module is configured to control, based on a transmit/receive requirement of a peer chip module paired with the second chip module, at least one second selection port to be switched to a read port or a write port.

10. A port allocation method, comprising:
    obtaining a transmit/receive requirement of a chip module;
    switching a first selection port of the chip module to a read port or a write port based on the obtained transmit/receive requirement of the chip module, and
    when a current ratio is different from a target ratio, controlling, based on a result of comparison between the target ratio and the current ratio, the at least one first selection port to be switched to a read port or a write port, until a ratio of read ports to write ports of the chip module is consistent with the target ratio.

11. The port allocation method according to claim 10, wherein the switching at least one first selection port to a read port or a write port based on the obtained transmit/receive requirement of the chip module comprises:
    obtaining a required ratio of write ports to read ports as the target ratio based on the transmit/receive requirement of the chip module;
    determining the current ratio of write ports to read ports in the chip module.

12. The port allocation method according to claim 11, further comprising:
    obtaining a required quantity and locations of write ports and a required quantity and locations of read ports based on the transmit/receive requirement of the chip module; and
    comparing the required quantity and the locations of write ports and the required quantity and the locations of read ports with a current quantity and locations of write ports and a current quantity and locations of read ports, to determine the at least one first selection port that needs to be switched.

13. The port allocation method according to claim 12, further comprising:
    determining that the at least one first selection port needs to be switched; and
    switching the at least one first selection port based on the transmit/receive requirement of the chip module.

14. The port allocation method according to claim 13, further comprising:
    sending a switching indication message to a peer chip module paired with the chip module; and
    receiving a switching completion indication message fed back by the peer chip module.

15. The port allocation method according to claim 14, further comprising:
    when the current ratio is less than the target ratio, controlling the first selection port acting as a read port to be switched to a write port; or
    when the current ratio is greater than the target ratio, controlling the first selection port acting as a write port to be switched to a read port.

16. The port allocation method according to claim 10, wherein each first selection port comprises: a first connection port, a first receiving circuit, a first sending circuit, and a first selector switch; the first connection port is connected to one of the first receiving circuit and the first sending circuit by using the first selector switch;
    when the first receiving circuit is connected to the first connection port, the first selection port is configured as a write port; and
    when the first sending circuit is connected to the first connection port, the first selection port is configured as a read port.

17. The port allocation method according to claim 10, further comprising:
- sending a switching indication message to a peer chip module paired with the chip module, and
- receiving a switching completion indication message fed back by the peer chip module.

18. A mobile terminal, comprising:
a chip module, comprising
- a plurality of first ports, wherein at least some of the plurality of first ports are first selection ports that can be configured as a read port or a write port; and
- a first control module configured to control, based on a transmit/receive requirement of the chip module, at least one of the first selection ports to be switched to a read port or a write port, to match the transmit/receive requirement of the chip module,
- wherein when a current ratio is different from a target ratio, the first control module is configured to control, based on a result of comparison between the target ratio and the current ratio, the at least one first selection port to be switched to a read port or a write port, until a ratio of read ports to write ports of the chip module is consistent with the target ratio.

19. The mobile terminal according to claim 18, wherein the first control module is further configured to:
- obtain a required ratio of write ports to read ports as the target ratio based on the transmit/receive requirement of the chip module, and
- determine the current ratio of write ports to read ports in the chip module.

20. The mobile terminal according to claim 19, wherein the first control module is further configured to:
- obtain a required quantity and locations of write ports and a required quantity and locations of read ports based on the transmit/receive requirement of the chip module; and
- compare the required quantity and the locations of write ports and the required quantity and the locations of read ports with a current quantity and locations of write ports and a current quantity and locations of read ports, to determine the at least one first selection port that needs to be switched.

* * * * *